Patented Apr. 30, 1935

1,999,793

UNITED STATES PATENT OFFICE 1,999,793

METHOD OF PRODUCING ALKYL PHENOLS

Charles A. Thomas, Wayne, Pa., assignor to The Sharples Solvents Corporation, Philadelphia, Pa., a corporation of Delaware No Drawing. Application March 24, 1933, Serial No. 662,531

18 Claims. (Cl. 260—154)

The present invention relates to the production of alkyl derivatives of phenolic compounds by the condensation of olefins with phenol or its derivatives in the presence of an acid catalyst. It comprises an improvement of the process defined and claimed in the co-pending application of William M. Lee and Lee H. Clark, Serial No. 623,486, filed July 20, 1932.

In the above-identified application, a method of producing phenolic derivatives was described, which involves the selective absorption of a desired olefin compound or mixture of olefin compounds from a mixture containing a larger number of such compounds. In the preferred method of procedure, in accordance with that application, the absorption of the desired olefin is obtained by a succession of counter-current batch contacts in which a given batch of acid successively contacts olefin mixtures containing progressively larger proportions of the olefin material which it is desired to absorb. At the completion of this absorption step, the acid liquor formed by the absorption of the desired olefin in the acid is contacted and agitated with an equimolecular proportion of phenol, the agitation being maintained for approximately one hour. The mixture so obtained is next subjected to a settling operation and gradually separates into an acid layer and a supernatant oily layer which is believed to consist principally of olefin dissolved in phenol and the first reaction product, alkyl phenyl ether. The acid layer is thereafter drawn off from the oil layer and the oil layer is subjected to reflux for a period of several hours at a temperature between 110° and 135° C. to produce the desired alkyl phenolic derivative. After washing and neutralization, the resulting product is purified by fractional distillation.

While the process described above constitutes a satisfactory method of producing alkyl derivatives of phenolic compounds, it possesses a number of serious disadvantages.

In the first place, difficulty is encountered in an attempt to separate the oil layer from the acid layer by the settling process to which it is subjected prior to the refluxing of the ether layer. Agitation of the acid liquor with phenol in accordance with the conditions outlined in that application tends to form an emulsion which can only be separated with great difficulty, and a prolonged settling operation is accordingly necessary in order to effect the adequate removal of acid from the oil layer. Furthermore, the acid is never separated from the oil layer to the desired degree in the performance of the process of that application.

The difficulty of separating the acid from the oil layer also has a number of incidental adverse effects. Thus, the prolonged contact of acid with the oil layer, which contains a certain amount of unconverted olefin, tends to cause the material to undergo an undesired polymerization.

The attainment of a substantially complete separation of acid from the remaining material is also important because of the fact that contact of excessive acid with the material under treatment during further processing tends to cause a decomposition of the desired end products and thus impair the efficiency of the process.

The effective removal of acid is also important because of the fact that large quantities of acid naturally require large amounts of water to be employed in the washing step and large amounts of alkali for the neutralizing operation. As it is desirable to extract valuable materials from the wash waters, it is naturally desirable to adopt a procedure which involves the use of as little washing material as possible. The effective removal of acid prior to the conversion of the oil layer to produce the desired derivative is accordingly highly desirable from the standpoint of avoidance of the use of excessive amounts of washing material. Excessive acid also forms phenol sulphonic acids, which in the subsequent neutralizing step form salts, which are not desired.

All of these by-products which result from inadequate removal of the acid, cause difficulty in effecting an adequate purification of the desired phenolic derivative in the ultimate distillation step. As a consequence of this fact, the desired compound is contaminated with an unduly large proportion of phenyl ethers, secondary phenols, sulphonic acids and other undesired compounds.

In the practice of the present invention, a procedure is adopted by which the acid may be readily removed from the oil layer. This result is obtained by the addition to the acid liquor containing the olefin, of an amount of the phenolic compound to be condensed with olefin in substantial excess of the molecular proportion theoretically required for reaction with the absorbed olefin therein. Such excess of phenolic compound tends to break the emulsion of the acid with the oil layer and thereby enables the acid to be quickly and adequately separated. Such prompt separation substantially completely avoids all of the undesired phenomena discussed above. On the other hand, a very small amount of acid remains in the oil layer in spite of the utilization of excess phenolic compound, and such acid is capable of adequately catalyzing the reaction by which the desired phenolic derivative is later produced.

In the practice of the invention it has been found that quantities of the phenolic compound containing an excess of from 15% to 100% of the normal molecular proportion are capable of causing a rapid demulsification of the acid-oil mixture, and the preferred practice of the present invention involves the utilization of such an excess. The very best results consistent with economy of use of apparatus have been obtained by the use of an excess of such compound amounting to approximately 25%. The excess of the compound so added not only aids in the separation of the oil from the acid, but it is also very useful in connection with the ultimate distillation of impurities from the desired phenolic material, as such excess tends to carry off a large proportion of such impurities when distilled from the residue containing the desired derivative.

In accordance with an alternative form of the invention, the excess phenolic compound is added in increments, the initial additional quantity of the compound added to the acid liquor amounting to only 3-10% more than the theoretical. An excess within this range is capable of effecting a rapid breaking of the initial emulsion of acid with oil. After this separation, an additional quantity of the phenolic compound amounting to from 10 to 65% of the molecular proportion which would be required to react with the olefin present, is added to the oil-containing material and refluxed with this material during the conversion thereof. This additional quantity of phenolic compound assists in the removal of impurities by fractional distillation, during the ultimate performance of that step of the process, in the same manner as discussed in connection with the embodiment described above. This alternative method of operation possesses the advantages that it avoids a loss of part of the phenolic compound by solution thereof in the acid. Such loss is necessarily inherent in the embodiment of the invention first described.

A further feature of the invention consists in the addition of a small amount of the phenolic compound which is being condensed with olefin to the residue formed as the result of the fractional distillation of the mixture. In the practice of such distillation, a point is reached at which the desired derivative is contaminated with undesired higher boiling compounds, such as higher ethers. When this temperature is reached an additional quantity of the phenolic derivative which is condensed with olefin in the practice of the invention is introduced and the residue is re-distilled. In the practice of such repeated distillations, an additional quantity of the desired derivative can be collected.

The practice of the invention will be best understood by reference to the following illustrative examples:

*Example 1*

An acid liquor was obtained by successive counter-current stepwise contact of a batch of 62% sulphuric acid with amylene-containing mixtures of progressively greater iso-amylene content, the last contact, involving treatment of an amylene mixture, including substantially equal proportions of normal and iso-amylene. This acid liquor contained approximately 1560 pounds of iso-amylene and the total weight of the mixture was approximately 8570 pounds. 3670 pounds of phenol, (a molecular excess of 75%), were added to the mixture and agitated therewith for a period of approximately one hour. The mixture was then subjected to a settling operation in which the sulphuric acid rapidly settled to the bottom, leaving a supernatant oily layer. The oily layer was thereafter refluxed for four hours at a temperature between 130° and 135° C. and subjected to water-washing and soda ash neutralization treatments. The crude phenolic condensation product, consisting principally of tertiary amyl phenol, was thereafter distilled under reduced pressure to obtain the relatively pure tertiary amyl phenol from the mixture containing amylene, phenol, amyl phenyl ethers, secondary amyl phenol and other undesired compounds. This distillation was conducted under a pressure of 20 mm., the heads being continuously removed up to a temperature of 139° C. The material boiling between 139° C. and 155° C. was separately collected, this material preponderating in the desired tertiary amyl phenol. The residue was removed from the still and stored for further processing, as explained in Example 3. 2693 pounds of the tertiary amyl phenol cut having a melting range from 84-89° C. were obtained.

*Example 2*

An acid liquor containing approximately 1560 pounds of iso-amylene material in approximately 8570 pounds of total mixture was obtained as in Example 1 above. 2215 pounds of phenol, (amounting to an excess of approximately 6.8%), were added to the acid liquor and agitated therewith for approximately one hour. The material was then subjected to a settling operation as in the example given above, the sulphuric acid rapidly settling from the oil layer. After removal of the sulphuric acid, 423 pounds of additional phenol were added and the material was then treated as in Example 1 above, to produce a relatively pure tertiary amyl phenol. 2370 pounds of the tertiary amyl phenol cut, having a melting range from 84° to 92° C. were obtained.

*Example 3*

The residues from a number of distillations in accordance with Examples 1 and 2 were separately collected. 940 pounds of phenol were added to 2340 pounds of such residue and the mixture was distilled under a pressure of 20 mm. The heads were collected up to a temperature of 139° C. and the tertiary amyl phenol fraction was separately collected between the temperatures of 139° and 155° C. A substantial additional quantity of the tertiary amyl phenol cut was thus obtained.

While the production of tertiary amyl phenol has been described in specific examples, it is to be understood that the process of this invention is applicable to phenolic compounds in general and may be utilized in other examples of the condensation of olefins with phenol and its derivatives. The invention should find especial utility in connection with the condensation of phenol with olefin material containing from two to ten carbon atoms to produce corresponding alkyl substituted phenols.

While I do not wish to be bound by any particular chemical theory as to the reasons for the results obtained by the practice of the present invention, it is believed that reasons for the superior yields and superior quality of the product can be at least partially accounted for by the following theoretical considerations.

In the practice of the invention in the condensation of amylenes with phenol, the following reactions may take place:

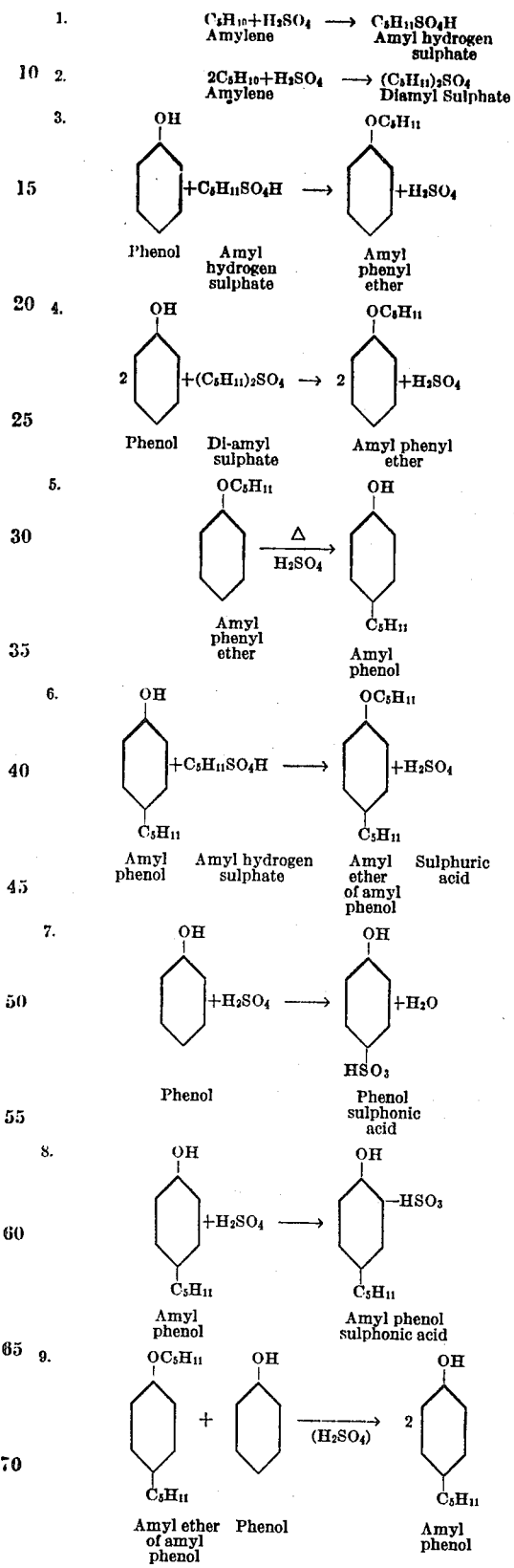

From a perusal of the above equations, it will be evident that the reactions indicated at 1–5 and 9 are useful in the formation of the desired amyl phenol and that the reactions indicated at 7 and 8 represent the formation of undesired by-products, while Equation 6 represents the conversion of the desired end product into an undesired compound.

If we now consider the effect of the addition of excess phenol as described above on these reactions, the following advantages will be noted. The initial addition of excess phenol to the acid liquor facilitates the removal of sulphuric acid therefrom and thus minimizes the quantity of undesired sulphonic acid material formed in accordance with Equations 7 and 8 above. The presence of excess phenol also tends to minimize the amount of undesired amyl ether of amyl phenol formed in accordance with Equation 6 and it permits the reaction of Equation 9 to take place, thereby converting this undesired phenyl ether into the desired derivative, as indicated in Equation 9.

It is believed that the principal advantage of the phenol added in accordance with Example 3 above consists in the fact that it facilitates the conversion of this ether in accordance with Equation 9.

While the use of excessive amounts of the phenolic material which is to be condensed with the olefin is described above, it will be understood that the addition of other substances which serve to cause a rapid separation of the acid from the ether comes within the purview of the invention.

I claim:

1. The method of condensing olefins with phenolic compounds to produce alkyl derivatives of the phenolic compounds of the class consisting of phenol and its derivatives which includes the steps of producing an acid liquor by treatment of olefin with an absorbing acid, reacting said acid liquor with a phenolic compound in substantial molecular excess of the absorbed olefin, separating the acid from the mixture by subsidence and refluxing the remaining material to produce the desired condensation product.

2. The method of condensing olefins with phenolic compounds to produce alkyl derivatives of the phenolic compounds of the class consisting of phenol and its derivatives which includes the steps of producing an acid liquor by treatment of olefin with an absorbing acid, reacting said acid liquor with a phenolic compound in substantial molecular excess of the absorbed olefin, separating the acid from the mixture by subsidence, adding an additional quantity of the phenolic compound to the remaining material, refluxing the mixture to produce the desired condensation product and removing excess phenol and other impurities from said product by fractional distillation.

3. The method of condensing olefins with phenolic compounds to produce alkyl derivatives of the phenolic compounds of the class consisting of phenol and its derivatives which includes the steps of producing an acid liquor by treatment of olefin with an absorbing acid, reacting said acid liquor with a phenolic compound in from 15 to 75% molecular excess of the absorbed olefin, separating the acid from the mixture by subsidence and refluxing the remaining material to produce the desired condensation product.

4. The method of condensing olefins with phenolic compounds to produce alkyl derivatives of the phenolic compounds of the class consisting of phenol and its derivatives which includes the steps of producing an acid liquor by treatment of olefin with an absorbing acid, reacting said acid liquor with a phenolic compound in from 3 to 10% molecular excess of the absorbed olefin, separating the acid from the mixture by subsidence, adding an additional quantity of the phenolic compound amounting to from 10 to 60% of the molecular equivalent of the olefin originally present to the remaining material, refluxing the mixture to produce the desired condensation product and removing excess phenol and other impurities from said product by fractional distillation.

5. The method of condensing olefins with phenol which includes the steps of producing an acid liquor by treatment of olefin with an absorbing acid, reacting said acid liquor with phenol in substantial molecular excess of the absorbed olefin, separating the acid from the mixture by subsidence and refluxing the remaining material to produce the desired condensation product.

6. The method of condensing olefins with phenol which includes the steps of producing an acid liquor by treatment of olefin with an absorbing acid, reacting said acid liquor with phenol in substantial molecular excess of the absorbed olefin, separating the acid from the mixture by subsidence, adding an additional quantity of phenol to the remaining material, refluxing the mixture to produce the desired condensation product and removing excess phenol and other impurities from said product by fractional distillation.

7. The method of condensing olefins with phenol which includes the steps of producing an acid liquor by treatment of olefin with an absorbing acid, reacting said acid liquor with phenol in from 15 to 75% molecular excess of the absorbed olefin, separating the acid from the mixture by subsidence and refluxing the remaining material to produce the desired condensation product.

8. The method of condensing olefins with phenol which includes the steps of producing an acid liquor by treatment of olefin with an absorbing acid, reacting said acid liquor with phenol in from 3 to 10% molecular excess of the absorbed olefin, separating the acid from the mixture by subsidence, adding an additional quantity of phenol amounting to from 10 to 60% of the molecular equivalent of the olefin originally present, to the remaining material, refluxing the mixture to produce the desired condensation product and removing excess phenol and other impurities from said product by fractional distillation.

9. The method of condensing amylenes with phenol which includes the steps of producing an acid liquor by treatment of amylene with an absorbing acid, reacting said acid liquor with phenol in substantial molecular excess of the absorbed amylene, separating the acid from the mixture by subsidence, refluxing the remaining material to produce the desired condensation product and removing excess phenol and other impurities from the resulting product by fractional distillation.

10. The method of condensing amylenes with phenol which includes the steps of producing an acid liquor by treatment of amylene with an absorbing acid, reacting said acid liquor with phenol in substantial molecular excess of the absorbed amylene, separating the acid from the mixture by subsidence, adding an additional quantity of phenol to the remaining material, refluxing the mixture to produce the desired condensation product and removing excess phenol and other impurities from said product by fractional distillation.

11. The method of condensing amylenes with phenol which includes the steps of producing an acid liquor by treatment of amylene with an absorbing acid, reacting said acid liquor with phenol in from 15 to 75% molecular excess of the absorbed amylene, separating the acid from the mixture by subsidence and refluxing the remaining material to produce the desired condensation product.

12. The method of condensing amylenes with phenol which includes the steps of producing an acid liquor by treatment of amylene with an absorbing acid, reacting said acid liquor with phenol in from 3 to 10% molecular excess of the absorbed amylene, separating the acid from the mixture by subsidence, adding an additional quantity of phenol amounting to from 10 to 60% of the molecular equivalent of the olefin originally present to the remaining material, refluxing the mixture to produce the desired condensation product and removing excess phenol and other impurities from said product by fractional distillation.

13. The method of forming tertiary amyl phenol which includes the steps of selectively absorbing iso-amylene from a mixture of normal- and iso-amylenes by means of sulphuric acid, separating the acid liquor so obtained from the unabsorbed normal-amylene, reacting said acid liquor with phenol in substantial molecular excess of the absorbed olefin, separating acid from the mixture by subsidence, refluxing the remaining material to produce the desired condensation product and removing excess phenol and other impurities from the condensation product by fractional distillation.

14. In the method of condensing olefins with phenolic compounds to produce alkyl derivatives of the phenolic compounds of the class consisting of phenol and its derivatives, the steps which comprise producing an acid liquor by treatment of olefin with an absorbing acid, reacting said acid liquor with a phenolic compound in from 3 to 10% molecular excess of the absorbed olefin and separating the acid from the mixture so formed by subsidence.

15. The method of condensing olefins with phenol which includes the steps of producing an acid liquor by treatment of olefin with sulphuric acid, reacting said acid liquor with phenol in sufficient molecular excess to facilitate separation of sulphuric acid from the resulting product, and separating the acid from the mixture by subsidence.

16. The method of condensing olefins with phenol which includes the steps of producing an acid liquor by treatment of olefin with sulphuric acid, reacting said acid liquor with phenol in sufficient molecular excess to facilitate separation of sulphuric acid from the resulting product, separating the acid from the mixture by subsidence, and refluxing the remaining material to produce the desired condensation product.

17. The method of condensing olefins with phenol which includes the steps of producing an acid liquor by treatment of olefin with sulphuric acid, reacting said acid liquor with phenol in sufficient molecular excess to facilitate separation of sulphuric acid from the resulting product, separating the acid from the mixture by subsidence, adding an additional quantity of phenol, refluxing the remaining material to produce the desired condensation product, and removing excess phenol and other impurities from said product by fractional distillation.

18. The method of producing alkyl phenolic compounds of the class consisting of phenol and its derivatives which comprises condensing phenolic compounds with olefins in the presence of an acid catalyst, removing the desired derivative from the mixture formed by the condensation reaction by fractional distillation, adding an additional quantity of the phenolic compound upon which the condensation reaction is performed to the residue remaining after said fractional distillation and subjecting the residue to a second distillation.

CHARLES A. THOMAS.